United States Patent [19]
Coles et al.

[11] Patent Number: 5,363,754
[45] Date of Patent: Nov. 15, 1994

[54] APPARATUS FOR PREPARING ANIMAL FEEDSTUFF FROM COTTON SEED

[75] Inventors: Richard G. Coles; Ian J. Broadfoot, both of Toowoomba, Australia

[73] Assignee: Grainco Queensland Co-Operative Association Limited, Queensland, Australia

[21] Appl. No.: 997,539

[22] Filed: Dec. 28, 1992

Related U.S. Application Data

[63] Continuation-in-part of Ser. No. 753,905, Sep. 3, 1991, Pat. No. 5,204,102.

[51] Int. Cl.⁵ .......................... A23L 1/20; A61K 35/78
[52] U.S. Cl. .......................................... 99/484; 19/40; 19/44; 99/483; 99/537; 99/567; 99/516
[58] Field of Search ................. 99/483, 484, 494, 514, 99/516, 518, 537, 567, 628, 600; 19/40, 41, 43, 44, 48 R, 55 R; 34/60, 61; 47/58, DIG. 9; 134/28, 30; 424/195.1; 426/630, 807

[56] References Cited

U.S. PATENT DOCUMENTS

| | | | |
|---|---|---|---|
| 3,919,742 | 11/1975 | Arifov et al. | 19/41 |
| 4,064,636 | 12/1977 | Downing | 34/60 |
| 4,173,177 | 11/1979 | Davis | 99/628 |
| 4,203,254 | 5/1980 | Downing | 47/58 |
| 4,520,529 | 6/1985 | Davis | 19/41 |
| 4,627,338 | 12/1986 | Sprott et al. | 99/516 X |
| 4,909,138 | 3/1990 | McAskie | 99/485 X |
| 4,942,643 | 7/1990 | Kincer et al. | 19/44 |
| 4,967,448 | 11/1990 | Mizer | 19/40 |
| 5,204,102 | 4/1993 | Coles et al. | 426/630 X |
| 5,249,335 | 10/1993 | Jones | 19/40 |

OTHER PUBLICATIONS

Chem. Abst., Gega et al., vol. 77; 4039g, 1973.
Chm. Abst., Bindra, vol. 84; 88018e, 1976.

*Primary Examiner*—Timothy F. Simone
*Attorney, Agent, or Firm*—Nixon & Vanderhye

[57] ABSTRACT

A method and apparatus to convert fluffy cotton seed to an animal feedstuff, comprises delinting the fluffy cotton seed to remove lint and tails therefrom, coating the delinted cotton seed with a binder, adding a filler to the cotton seed coated with the binder, and drying the coated cotton seed to produce a flowable product. The method and apparatus converts a hitherto waste product to a valuable commercial product.

9 Claims, 4 Drawing Sheets

APPARATUS FOR PREPARING ANIMAL FEEDSTUFF FROM COTTON SEED

RELATED APPLICATIONS

This invention is a continuation in part application of U.S. 07/753905 filed on Sep. 3, 1991, U.S. Pat. No. 5,204,102.

BACKGROUND AND SUMMARY OF THE INVENTION

This invention relates to a method and apparatus for preparing animal feedstuff and particularly to a method and apparatus which can prepare a flowable animal feedstuff from cotton seed.

Fluffy cotton seed is the cotton seed including a quantity of adherent cotton fibres, and is the product left over after the main cotton ball has been removed by ginning. Fluffy cotton seed is produced in large amounts and is generally considered to be a waste product. However, because of its high nutrient quantity, it has been considered for use as an animal feed supplement and in this context has been used by dairy farms.

A disadvantage with fluffy cotton seed is its inability to form a flowable product. Thus, it is found that the fluffy cotton seed has a tendency to tangle and form clumps of large sizes resulting in extreme difficulties in bulk handling of the product.

The present invention has developed a method and apparatus where fluffy cotton seed can be treated to form a flowable product which has good bulk handling properties.

In one form, the invention resides in a method for preparing a flowable animal feedstuff comprising cotton seed, the method comprising subjecting fluffy cotton seed to a delinting step to at least partially remove lint and/or tails from the cotton seed;

at least partially coating the delinted cotton seed with a binder;

at least partially coating the delinted cotton seed with a filler; and drying the coated cotton seed to produce a flowable product.

Suitably, the binder is added to the delinted cotton seed before the filler, although combined addition of the binder and filler together is envisaged.

Suitably, the fluffy cotton seed is delinted by a heating step, which may include contacting the fluffy cotton seed with a flame. Alternatively, chemical delinting or delinting using cryogenic techniques are envisaged.

The delinting step suitably includes a combination of heating the fluffy cotton seed to at least partially burn, singe or carbonised the fluffy parts of the cotton seed, and separating the burnt, singed or carbonised parts by a separating action such as an abrasion step. The abrasion step may be achieved by vibrating or tumbling the cotton seed to remove the burnt fluffy parts.

In another form, the invention resides in an apparatus for preparing a flowable animal feedstuff comprising cotton seed, the apparatus comprising a delinter to at least partially remove lint and/or tails from the cotton seed;

first coating means to at least partially coat the delinted cotton seed with a binder;

second coating means to at least partially coat the delinted cotton seed with a filler;

a drier to dry the coated cotton seed to produce a flowable product; and conveying means to convey the cotton seed between the delinter, first coating means, second coating means and drier.

The apparatus may further include a hopper for storing fluffy cotton seed to be passed to the delinter.

Suitably, the hopper outlet is associated with a first conveying means to convey the hopper contents towards the delinter.

The first conveying means may comprise an endless belt conveyor having an upper surface which passes beneath the hopper outlet. Suitably, the upper surface is spaced just below the outlet to also function as a closure for the outlet when the conveyor is not in use. A screw conveyor may also be used.

The first conveying means may have a discharge end to pass the cotton seed to the delinter. Suitably, the discharge end initially passes the cotton seed into a feeding means to feed the cotton seed to the delinter. The feeding means may comprise a rotary feeder.

The delinter may comprise a heating means to at least partially burn or singe or carbonise fluffy parts of the cotton seed. This may comprise the lint and/or tails of the cotton seed.

The heating means may comprise one or more flame emitters or burners. Suitably, the cotton seed is conveyed past the flame emitters along a second conveying means. The second conveying means may comprise a vibrating bed which may be inclined to facilitate movement of the cotton seed from an upper inlet end to a lower outlet end of the vibrating bed.

The vibrating bed may be provided with a plurality of apertures to facilitate removal of the burnt, singed or carbonised lint and/or tails of the cotton seed. Suitably, a collection bed or container is provided beneath the vibrating bed to collect any such material which passes through the apertures.

The delinting operation may be such as to remove about 50% of the cotton. This may result in reduction of the total weight of the fluffy cotton seed by about 5%.

In an alternative, the cotton seed may pass through a rotary trommel provided with a plurality of apertures. The rotary trommel may also function to remove the burnt, singed or carbonised products which may pass through the apertures and to a collecting bed or tray. The heating means may be present in or before the trommel.

Rotation of the trommel or vibrating of the vibrating bed may cause a buffing or abrasion action to facilitate removal of the burnt portions of the cotton seed.

In a further embodiment, the delinter may comprise a rotating trommel fitted with a plurality of burners in a plurality of chambers. These chambers can be operated separately to adjust for the amount of lint on the white seed coming from various ginning companies. The heat from this type of delinter can be harvested to assist the drying process. Part of this rotating trommel can consist of a screening section to remove carbonised lint and impurities in the cotton seed such as sticks and leaf material.

The first coating means may at least partially coat the cotton seed with a binder. The first coating means may comprise a spray coater or nozzle which may spray or pass the binder onto the cotton seed.

The first coating means is suitably located such that cotton seed passing from the delinter is passed towards the first coating means.

The delinted cotton seed may prevent or reduce the possibility of agglomeration between cotton seeds having long cotton fibrils during the coating process.

The main function of the binder is to cement the adherent cotton fibres to the seed and to act as a base to which the filler can be adhered to so as to substantially encapsulate the seed and provide a flowable product.

Therefore, the binder may be such that at its use temperature (usually ambient) it initially has a sticky or tacky consistency but is capable of changing to a non-sticky or tacky state when mixed with the filler and/or dried or heated.

The binder may include gums, such as gum arabic, starches, lignasite (a tree sap residue produced as a byproduct in paper making), a molasses or molasses-containing product, or a syrup such as corn syrup. The molasses may include the molasses left after crystallisation of sugar therefrom or a dundar. A mixture of binders may be used.

The binder may be diluted if necessary or required, to make it more flowable and therefore improve its spray characteristics. A suitable diluting agent is water. When molasses is used, it is preferred to use a one-to-one ratio of molasses and water.

An advantage of utilising water is that spray coating step may also facilitate extinguishing any still burning or smouldering cotton seed which has been conveyed past the delinter.

The coated cotton seed may be further coated by a second coating means where one or more fillers can be added to the cotton seed. The second coating means may comprise a continuous flow coater.

The filler may be provided to make the feedstuff flowable. A secondary purpose may be as a nutrient provider. Suitable fillers are inert mineral powders such as calcium carbonate, lime, diatomaceous earth, forms of clay such as bentonite and kaolin, extruded or textured proteins such as those derived from soybeans, and ground cereal grains such as corn, wheat, barley, maize and sorghum. Mixture of these and other fillers are also useful. The most preferred filler is bentonite, which is a colloidal clay commonly used as a food additive and which is readily available, and mixtures of bentonite with lime and diatomaceous earth.

The nature of the binder and filler will primarily be determined by the particular type of animal the feedstuff is required for and whether the feedstuff is intended only as a supplement or as a complete food.

Therefore, other additives may also be included in the coating. These may comprise vitamins, minerals, trace elements, veterinary products for the prevention, control or eradication of disease, growth stimulating factors and the like.

The drier may comprise a fluidised bed fryer which may dry the cotton seed by application of hot air. Suitably, hot air is recycled from the hearing means in the delinter and if necessary, additional heat (such as by a booster heating means) may be provided to heat the air to the required temperature.

If necessary, a cooling chamber may be located adjacent the drier to cool the heated cotton seed to a temperature where it can be handled, packaged and the like.

The outlet may be located in the cooling chamber.

The invention will be further illustrated by the following embodiment as illustrated in the accompanying drawings.

DETAILED DESCRIPTION OF THE DRAWINGS

Figure 1:
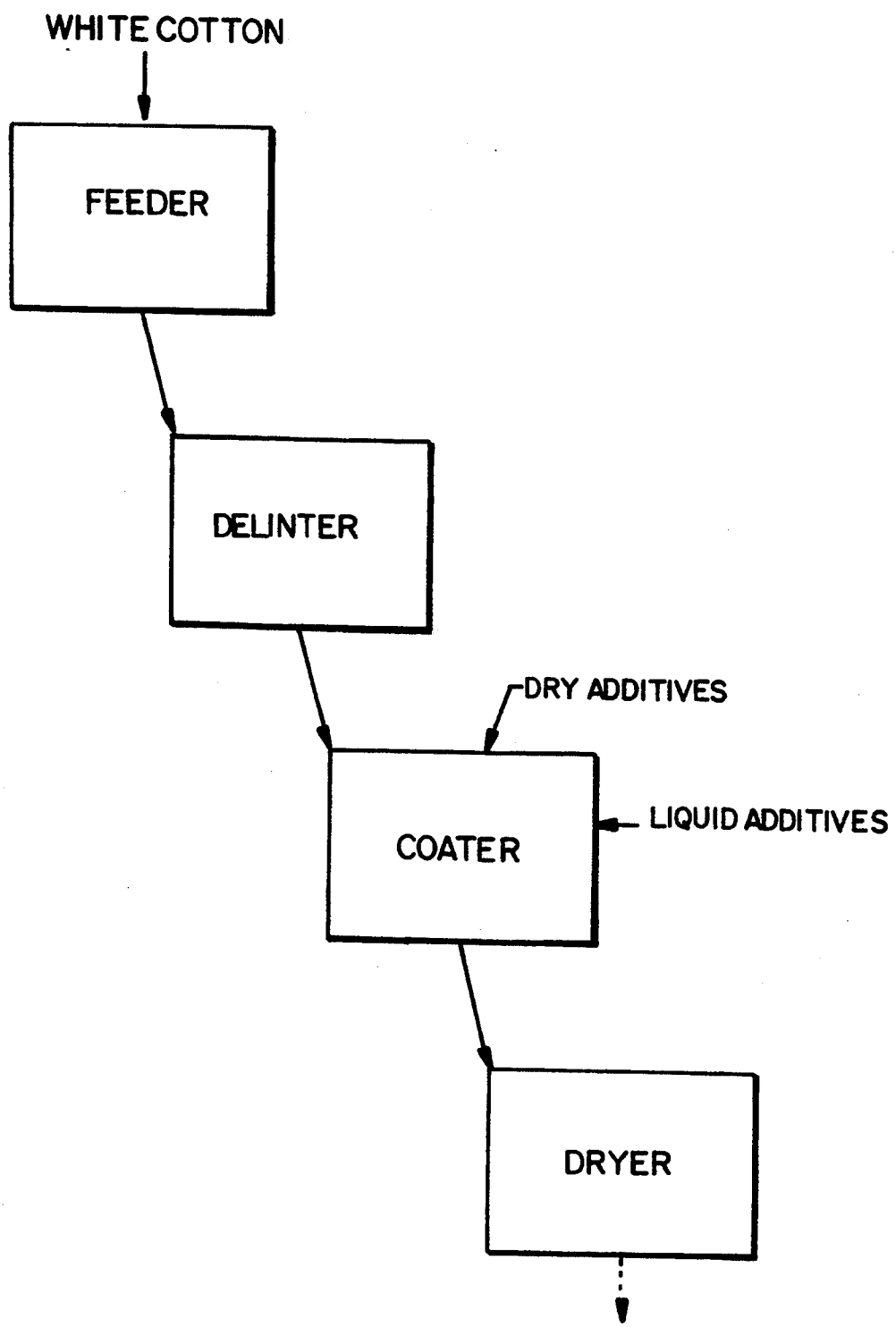
FIG. 1 illustrates a flow chart showing the various steps of the apparatus.
Figure 2:
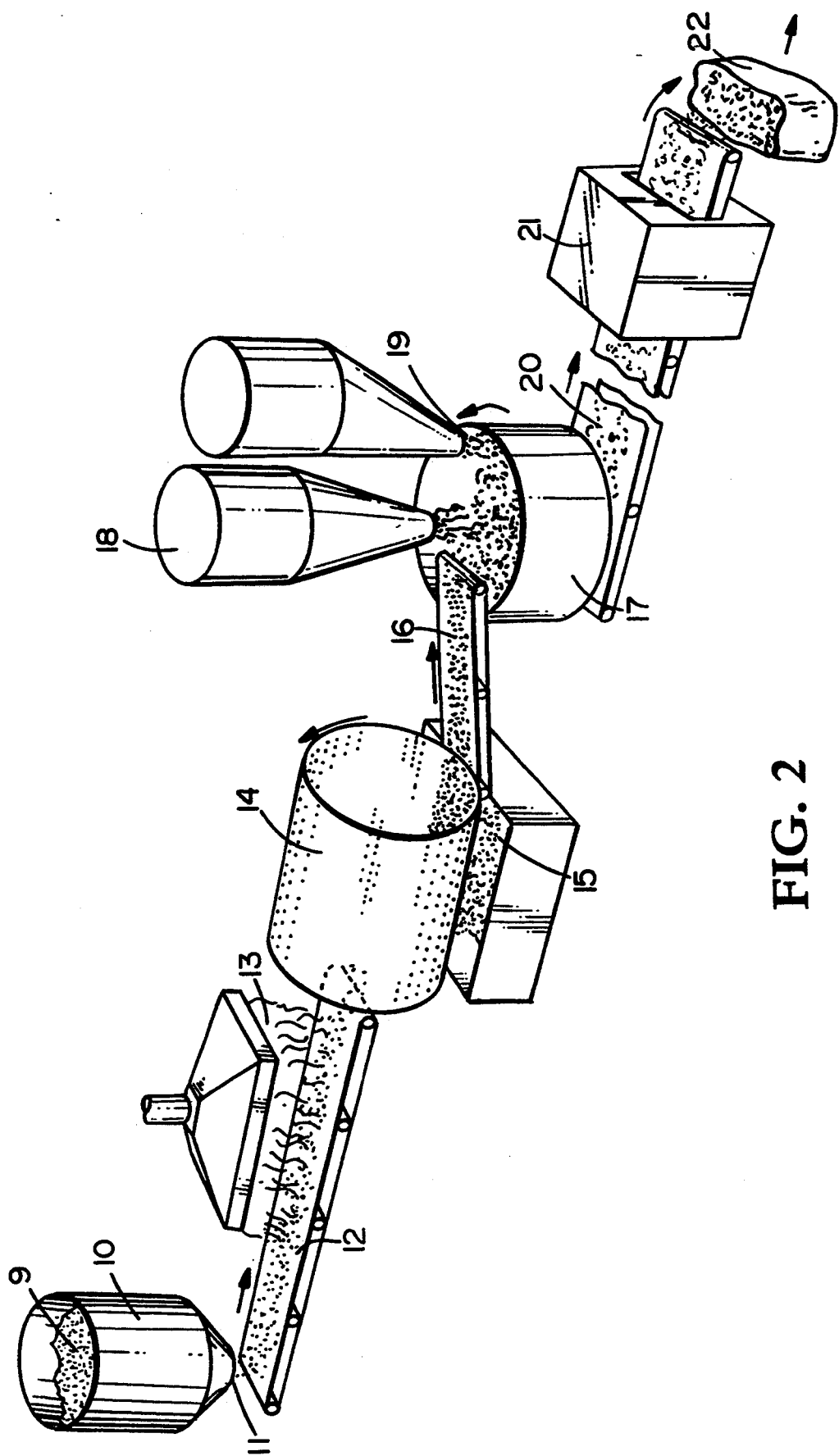
FIG. 2 is an apparatus according to a first embodiment of the invention.
Figure 3:
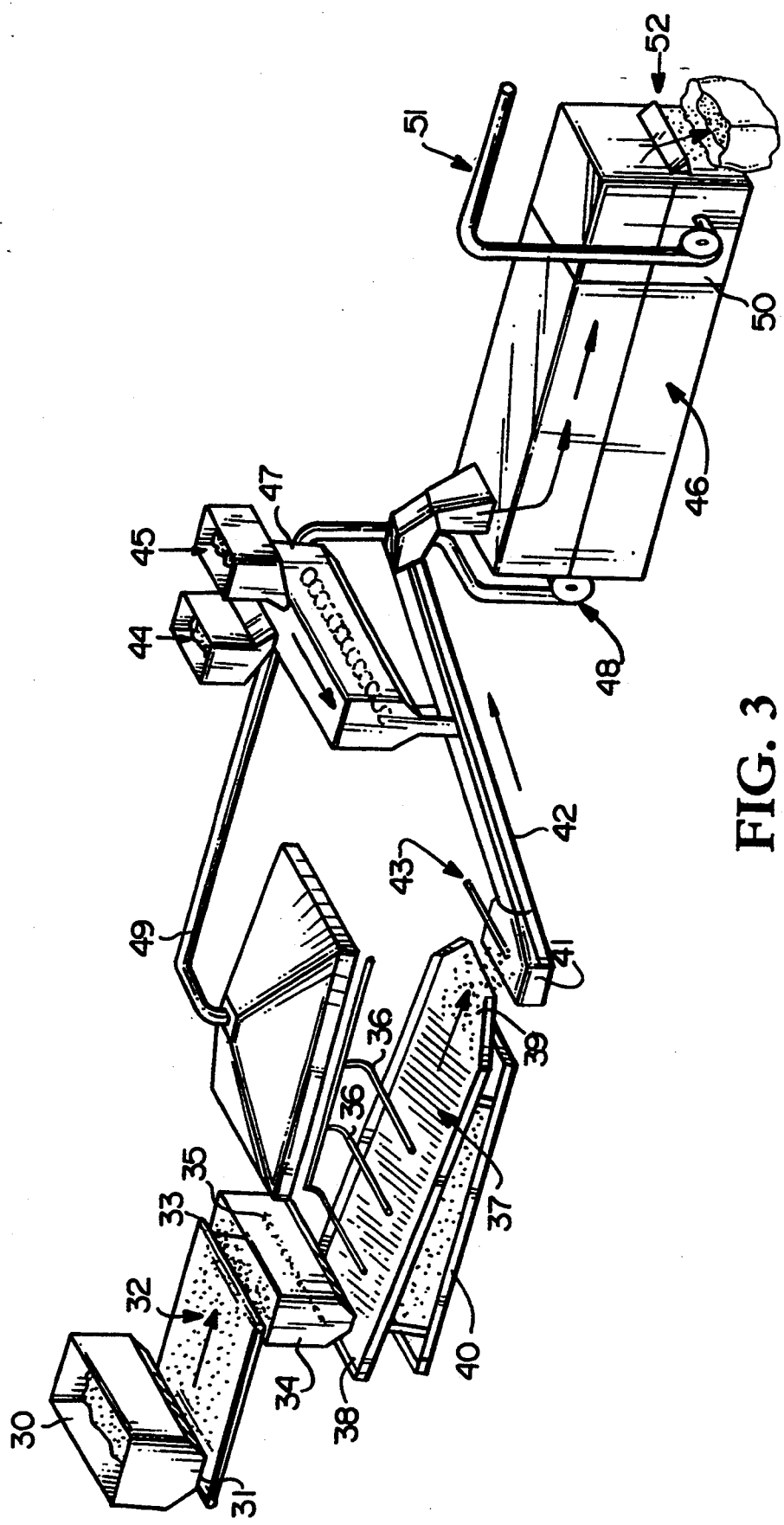
FIG. 3 is an apparatus according to a second embodiment of the invention.
Figure 4:
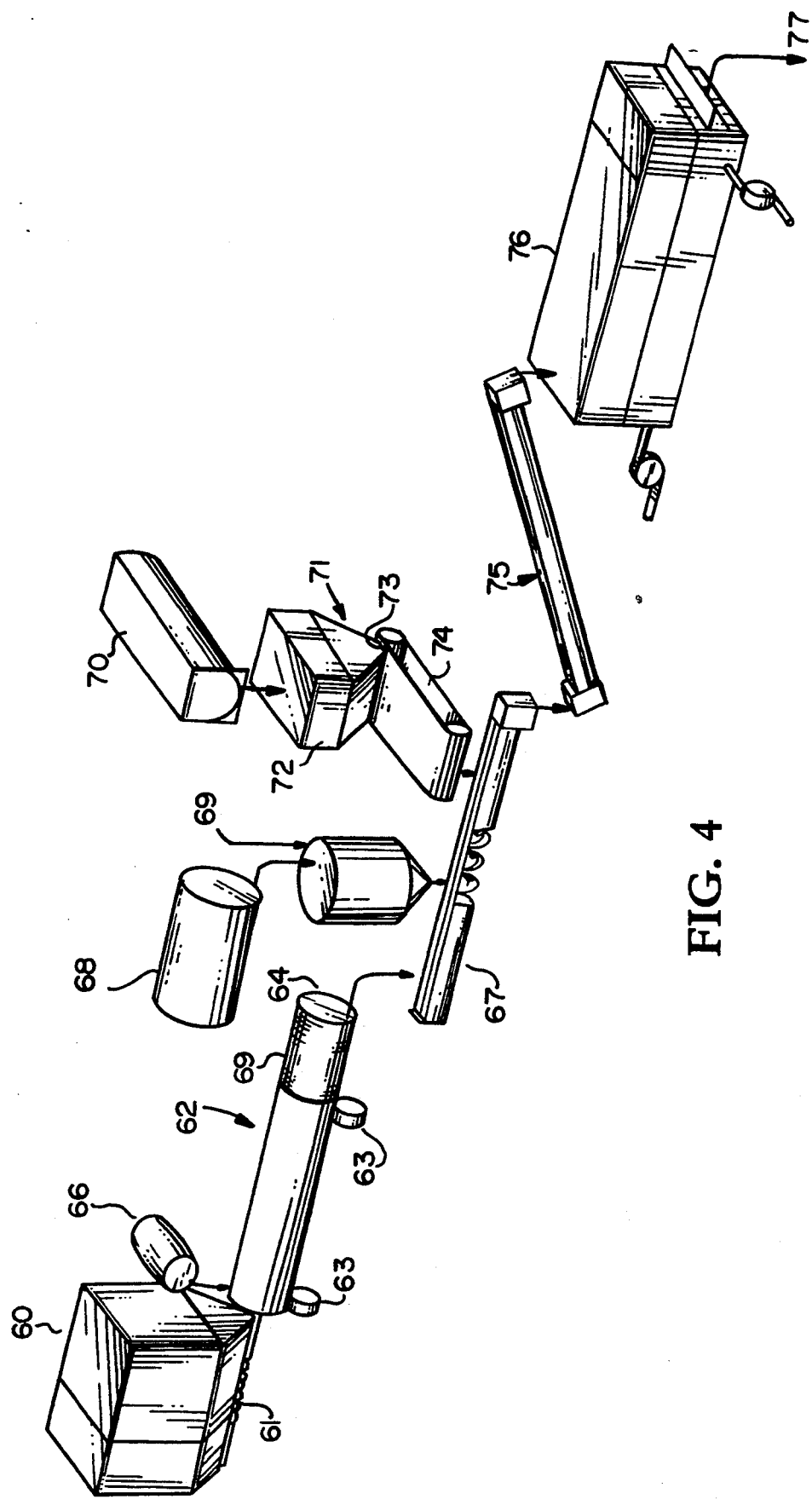
FIG. 4 is an apparatus according to a third embodiment of the invention.

Referring to the drawings, FIGS. 2, 3 and 4 show an apparatus to carry out the flow process as illustrated in FIG. 1.

Referring first to the apparatus in FIG. 2, fluffy cotton seed 9 was distributed from an overhead bin 10 with a "live" floor 11 evenly across a flame delinting bed 12. As the fluffy cotton seed was transported down the bed, the bed was vibrated to cause the seed to undergo a tumbling action. During such tumbling action the seed successively passed a number of gas flames 13 which singed the adherent fluffy cotton, reducing the amount of cotton by about 40–50%. The flame delinted seed was then transported to a buffing trommel 14 which abrasively removed the charcoal 15 from it.

The partially delinted seed 16 was charged to a rotating chamber 17. Molasses 18, bentonite, lime and diatomaceous earth 19 were metered into the chamber to provide approximately 5% by weight of molasses, approximately 3% by weight of bentonire, 3% by weight of lime and 3% by weight of diatomaceous earth. Rotation was continued until the fluffy cotton seed was completely coated. The coated seed 20 was then transported to a drier 21 and dried with hot air prior to bagging 22.

The resultant feedstuff had the following nutrient specification (on a dry basis):

| | |
|---|---|
| Metabolic Energy (Ruminant) | 11–12 MJ/Kg |
| Nitrogen Free Extractives | 20–30% |
| Protein | 18–22% |
| Fat | 18–22% |
| Ash | 8–12% |
| Moisture | 8–12% |

It was a chewable pellet of high nutritive value which was readily acceptable by the cattle to which it was fed.

Referring to FIG. 3, there is illustrated an apparatus according to a second embodiment of the invention.

The apparatus includes a hopper 30 having an elongate bin-shaped configuration with an open top to allow cotton seed to be placed therein. The bottom portion of hopper 30 is tapered and includes a lower outlet 31. Outlet 31 is in the form of an elongate slot extending along the bottom of hopper 30. Below outlet 31 is provided a first conveying means in the form of an endless belt conveyor 32. Conveyor 32 has an upper surface which passes below outlet 31 and therefore collects the cotton seed from the hopper. The rate of movement of conveyor 32 determines the rate of discharge of cotton seed from hopper 30. This arrangement is called a "live" floor hopper.

Conveyor 32 has a discharge end 33 which passes the cotton seed into a feeding means in the form of a rotary feeder 34. Rotary feeder 34 includes a feed auger 35 which passes the cotton seed evenly to the next stage which is the delinter.

The delinter comprises a heating means in the form of a number of flame emitters or burners 36. Burners 36 can be coupled to a supply of combustible gas (not shown).

Burners 36 are located transversely across an elongate planar vibrating bed 37. Vibrating bed 37 is inclined having an upper inlet end 38 and a lower outlet end 39. Vibrating bed is caused to vibrate or oscillate which causes the cotton seed to pass from the inlet end to the outlet end. During this conveying, the cotton seed is caused to pass beneath burners 36 which causes burning, singeing or carbonisation of the fluffy component of the cotton seed which includes the lint and/or tails.

Vibrating bed 37 is formed from a mesh or apertured configuration such that the burnt or carbonised products are abraded away from the remaining cotton seed by the vibrating section and pass through the mesh or apertures into a collecting tray 40.

The delinted cotton seed passes through outlet end 39 and into a first coating means 41 which comprises the lower end of a continuous flow coater 42. Coating means 41 is associated with a spray bar 43 which sprays the delinted cotton seed with a binder or a binder-containing mixture. In the embodiment, this comprises a molasses/water one-to-one mixture.

The binder-coated cotton seed passes up the continuous flow coater and in the process is coated by one or more fillers.

The fillers are initially stored in hoppers 44, 45 having outlets which discharge the fillers into a powder ribbon blender 47 which in turn has an outlet to pass the filler into the continuous flow coater. In this arrangement, as the cotton seed passes up the continuous flow coater, it is intimately mixed with the one or more fillers.

In the embodiment, the filler comprises a bentonite diatomaceous earth mixture.

The cotton seed coated with the binder and filler is then passed into a drier 46 in the form of a fluid bed drier. The cotton seed is conveyed on a bed of hot pulsating air until dry which is some 3-4 meters in length.

The drier draws its initial hot air from a hot air recycle 49 located above burners 36. An additional heater 48 is provided to heat the air to the required temperature.

Adjacent the outlet side of drier 46 is located a cooling chamber 50 having a cool air intake 51 which cools the heated and dried cotton seed to bring it back to ambient temperature suitable for discharge through outlet 52 and for packaging, handling and the like.

FIG. 4 illustrates a further alternative apparatus with which to prepare the food product. The apparatus of FIG. 4 includes a hopper 60 having a capacity of 5 tonnes and including a "live" floor which is in the form of an auger 61 located at the base of the hopper and which passes the initial fluffy cotton seed into the delinter 62. Within hopper 60 are located four rotating augers which activate the bottom of the mass of fluffy cotton seed within the hopper to prevent clogging of the seed. Delinter 62 comprises an elongate inclined trommel. The upper end of the trommel is associated with auger 61 such that fluffy cotton seed initially passes into the upper or higher end of the trommel. Rotation of trommel 62 by external drives 63 causes the cotton seed to move gradually from the upper end to the lower discharge end 64. Within trommel 62 is located a burner (not shown) which extends longitudinally and through the centre of the interior of trommel 62. The burner receives its LPG or natural gas from a storage tank 66. Within trommel 62 are located a number of internal mixers or bats which pick up the fluffy cotton seed and which drop it vertically through the flame being emitted from the burner. This process is repeated up to fifty times. The burner extends along the initial portion of the trommel 62, and this portion is not provided with any apertures in the wall. During the rotating process, the fluffy cotton seed is burned, singed or carbonised and the rotating and abrading action causes the burnt bits to be removed. When the cotton seed reaches the discharge end portion 64 of trommel 62, this portion includes wall perforations 65 through which the abraded portions of the cotton seed can pass and be removed. The delinted cotton seed passes through outlet 64 and into a continuous flow coater 67. Continuous flow coater 67 comprises an elongate trough fitted with mechanical paddles. The mechanical paddles causes mixing of the cotton seed as its is passed from one end of flow coater 67 to the other end. A binder in the form of a watered-down solution of molasses, is added to the delinted cotton seed as it is mixed and passed along the trough of flow coater 67. The molasses passes from a molasses storage tank 68 into a blending vat 69 where water is blended with the molasses to provide it with the correct viscosity to allow it to be sprayed over the delinted cotton seed in flow coater 67. After the cotton seed has been sprayed with the water/molasses mixture, it is contacted with a binder in the form of a powder. The binder comprises a powder or mixture of powders initially held in a holding tank 70 and which can be passed in metered quantities to a powder coater 71. In the embodiment, the powder coater comprises a hopper 72 having a lower discharge slot 73 along which an endless belt conveyor 74 passes. The endless belt conveyor 74 passes the powder or powder blend into flow coater 67 and "down stream" from where the molasses mixes with the cotton seed. The sticky nature of the molasses/water ensures that the powder sticks to the cotton seed and mixing of the cotton seed and powder is continued until an even coating of the powder is formed. The cotton seed coated with the powder is passed along a tubeveyor 75 and into one of a drier 76. Drier 76 is a gas-fired drier and the wet, coated cotton seed passes therealong over a period of time and emerges in dry and flowable state through outlet 77 and ready for storage or packaging.

On a weight basis, it is preferred that the percentage of filler is within the range of 5-10% and preferably about 40% and the percentage of binder is within the range of 1-10% and most preferably 5%. Any additives are suitably within the range of 5% of the total feedstuff and most preferably in an amount of about 1%.

The feedstuff has particular suitability as a ruminant feedstuff supplement.

It should be appreciated that various other changes and modifications may be made to the invention without departing from the spirit and scope of the invention as defined in the appended claims.

We claim:

1. An apparatus for preparing a flowable animal feedstuff comprising cotton seed, the apparatus comprising a delinter to at least partially remove lint and/or tails from the cotton seed, the delinter including a heater to burn the fluffy parts of the cotton seed;

first coating means to at least partially coat the delinter cotton seed with a binder;

second coating means to at least partially coat the delinted cotton seed with a filler;

a drier to dry the coated cotton seed to produce a flowable product; and conveying means to convey the cotton seed between the delinter, first coating means, second coating means and drier.

2. The apparatus as claimed in claim 1, wherein the heater comprises a flame emitter.

3. The apparatus as claimed in claim 1, wherein the delinter further comprises abrasion means to separate the burnt portions of the cotton seed from the seed.

4. The apparatus as claimed in claim 3, wherein the delinter comprises a vibrating screen bed over which the cotton seed passes.

5. The apparatus as claimed in claim 3, wherein the delinter comprises an apertured rotating trommel through which the cotton seed passes.

6. The apparatus as claimed in claim 1, wherein the first coating means comprises a mixer to mix the delinted cotton seed, and a nozzle or outlet through which the binder can pass to mix with and contact the cotton seed.

7. The apparatus as claimed in claim 1, wherein the second coating means comprises a mixer to mix the delinted cotton seed, and a nozzle or outlet through which the filler can pass to mix with and coat the cotton seed.

8. The apparatus as claimed in claim 7, wherein the mixer of the first and second coating means comprises an elongate trough along which the delinted cotton can pass and be mixed, and where the cotton seed is initially contacted with the binder and subsequently with the filler.

9. The apparatus as claimed in claim 1, wherein the drier comprises a heater air drier through which the coated cotton seed passes.

* * * * *